Nov. 21, 1967 — S. WOLF ETAL — 3,353,305

TILTED SPINDLE GRINDER

Filed Jan. 27, 1965 — 4 Sheets-Sheet 1

INVENTORS.
SIEGFRIED WOLF &
CLAYTON R. YOUNG
BY *Tilberry & Body*
ATTORNEYS

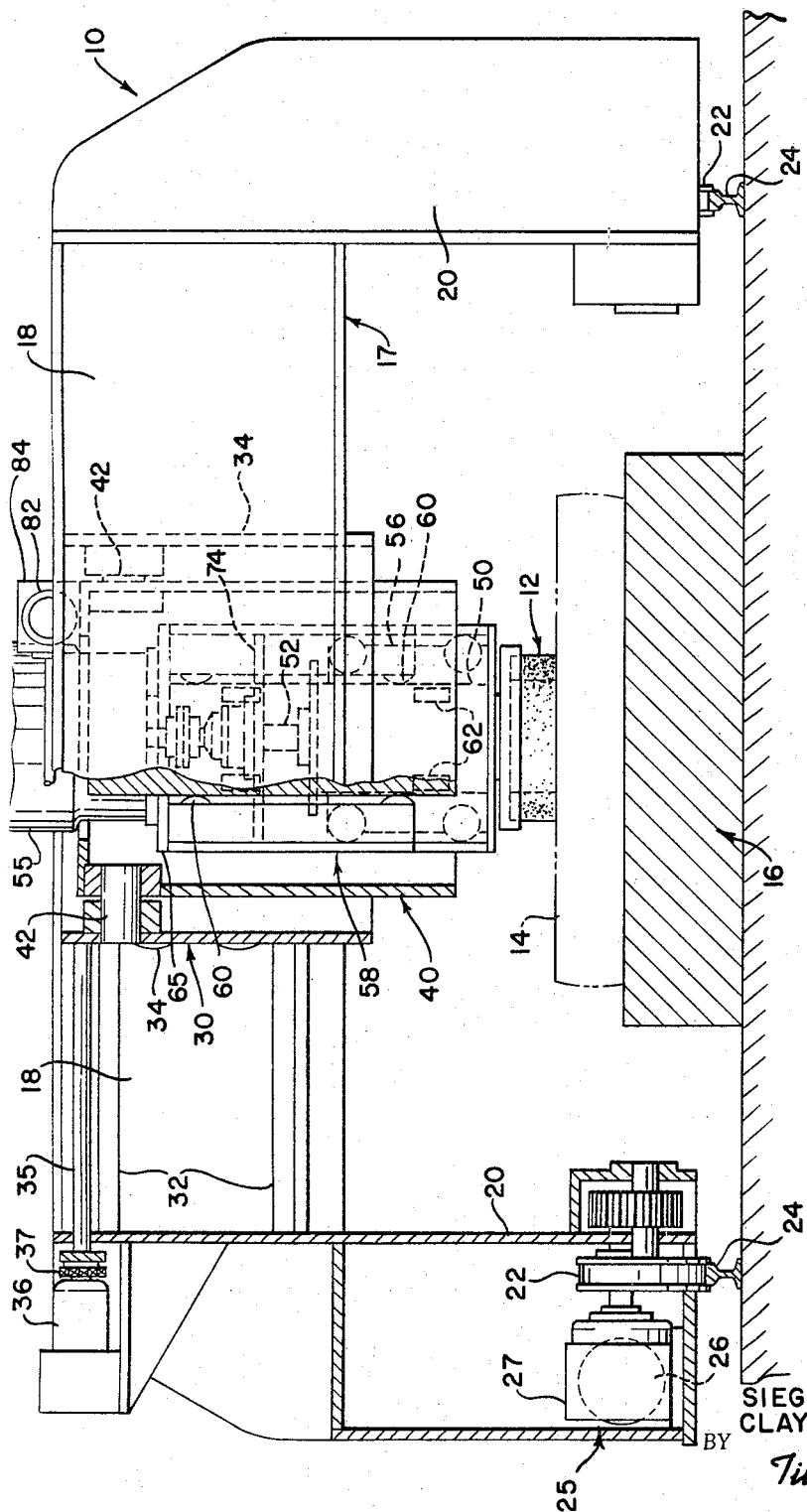
FIG. 2
INVENTORS.
SIEGFRIED WOLF &
CLAYTON R. YOUNG
BY 
ATTORNEYS Nov. 21, 1967  S. WOLF ETAL  3,353,305
TILTED SPINDLE GRINDER
Filed Jan. 27, 1965  4 Sheets-Sheet 3
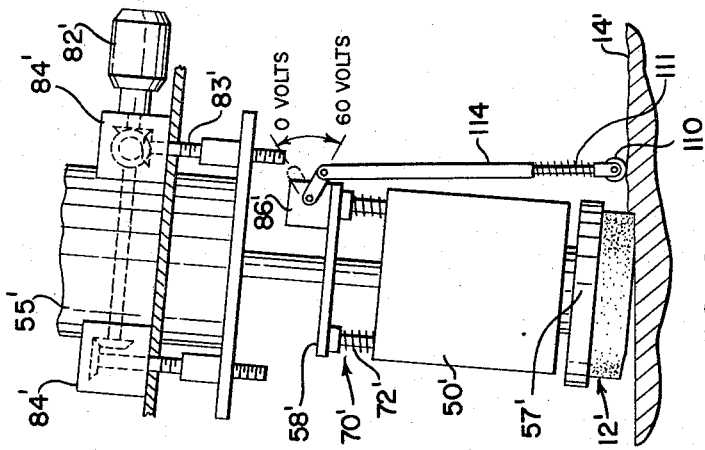
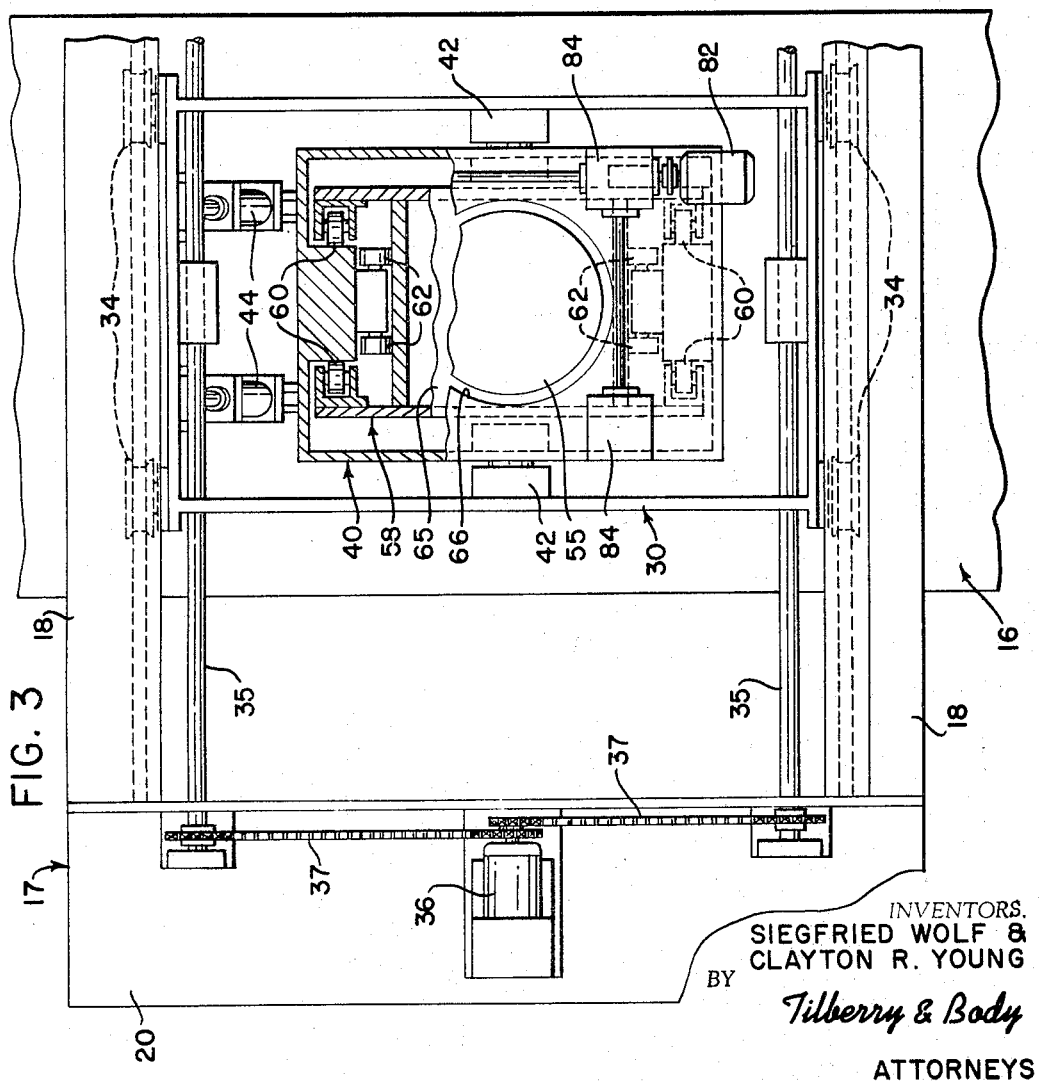
INVENTORS.
SIEGFRIED WOLF &
CLAYTON R. YOUNG
BY
*Tilberry & Body*
ATTORNEYS

# United States Patent Office 3,353,305
Patented Nov. 21, 1967

3,353,305
TILTED SPINDLE GRINDER
Siegfried Wolf, Canton, and Clayton R. Young, Salem, Ohio, assignors to E. W. Bliss Company, Canton, Ohio, a corporation of Delaware
Filed Jan. 27, 1965, Ser. No. 428,375
3 Claims. (Cl. 51—165)

ABSTRACT OF THE DISCLOSURE

The disclosure pertains to the art of power grinders and more particularly to an improved grinding machine for removing a uniform thickness of material from an irregular surface in which the grinding wheel is mounted for rotation on a spindle inclined slightly from vertical in the direction of the grind. A tiltable support head movable in the direction of grind has mounted thereon a reciprocatory grinder support head movable axially along the rotational axis of the grinding wheel. A grinder spindle having the grinding wheel mounted thereon is in turn reciprocally mounted on the grinder support head. Spring suspension bolts yieldably support the grinder spindle permiting a limited axial movement relative to the grinder support head such that the spindle, spindle support head and tiltable support head together define a self contained telescopic and tiltable grinder support structure. Servo-control means sense changes in surface unevenness and cause an advance or retraction of the grinder support head relative to the grinder spindle so as to maintain a predetermined grinding pressure between the grinding wheel and surfaces being ground during traversing movement.

---

The invention will be described with particular reference to a machine for grinding steel billets or slabs of the type disclosed in U.S. Patent 3,118,254 issued Jan. 21, 1964, however, it should be appreciated that it has much broader applications and may be used wherever a uniform thickness of material is to be removed from a workpiece.

The purpose of grinding billets or slabs is to remove the scale and imperfections on the surface of the piece so as to minimize defects when it is subsequently heated and rolled.

Grinders of the type disclosed in the above mentioned patent commonly employ a reciprocating table on which a billet or slab to be ground is clamped. A grinding wheel mounted on a horizontal arbor, with its axis of rotation parallel to the longitudinal axis of the table, is brought down against the surface to be ground with a predetermined pressure. Variations from this pressure caused by irregularities in the surface are sensed electrically and adjustment is made in the vertical position of the grinding wheel to automatically compensate for the increase or decrease in grinding pressure so as to maintain a uniform pressure. Thus, even if the workpiece being ground is warped, a uniform thickness of material is removed as the workpiece is traversed beneath the grinding wheel. After each pass, the wheel is laterally indexed to make an overlapping pass on the next reciprocation of the table, this operation being repeated with each reciprocation until all of the longitudinal surfaces of the workpiece are ground.

With this type of machine the width of grind is limited by the grinding pressure and to some extent the diameter of the grinding wheel. As a rule several passes of the workpiece beneath the wheel are required in order to remove the scale from one surface. In addition, since the grinding wheel rotates on a horizontal axis extending parallel to the movement of the workpiece, the curvature of the wheel imparts a fluted cross-sectional profile to the workpiece, wherein after a series of passes, the surface being ground is marked by a series of parallel rows defined by each pass of the workpiece beneath the grinding wheel.

Accordingly, this invention has as an object a grinding machine rotatably mounting a grinding wheel on a spindle inclined slightly from vertical to present the grinding wheel at an angle of attack inclined relative to the workpiece surface whereby the diameter of the grinding wheel becomes a significant factor in determining the width of grind. With such a grinder, a wider and more shallow grind is made possible without increasing the grinding pressure.

Another object is to provide a new and improved reciprocal mounting arrangement for the grinding wheel spindle permitting yieldable movement thereof along the axis of rotation thus allowing movement of the grinding wheel toward and away from the workpiece to compensate for surface unevenness.

In cooperation with the spindle mounting, a servo-control mechanism provides automatic adjustment of the spindle position so as to maintain a uniform grinding pressure between the workpiece and grinding wheel.

Still another object is the provision of an alternative servo-control arrangement operating independently of the yieldable spindle mounting for detecting undulations in the surface of the workpiece in front of the grinding wheel and causing a compensating adjustment to be made in the vertical position of the grinder spindle so as to maintain a uniform grinding pressure.

In accordance with the objects of the present invention a grinding machine is provided comprising a grinder support head arranged for movement toward and away from a workpiece, a grinding spindle tilted slightly from a vertical position in the direction of grind, a yieldable mounting holding the spindle on the grinder support head and biasing the spindle downwardly along its axis, a grinding wheel carried by the spindle being engageable with the workpiece at an angle of attack corresponding to the angle of tilt of the spindle, a movable structure for traversing the workpiece and grinder support head relative to each other, and a servo-control associated with the grinder being responsive to the deflections of the spindle on the yieldable mounting relative to the support head for detecting changes in the grinding pressure and causing the support head to move relative to the spindle so as to maintain a predetermined grinding pressure.

Further in accordance with the invention, the spindle is pivotally mounted with respect to the workpiece and can be tilted in opposite directions from vertical thus to grind upon each traversing motion.

Further in accordance with the invention and as an alternative to the above servo-control responsive to deflection of the spindle relative to the support head, a tracing member is provided for following the undulations of the workpiece in front of the grinding wheel, the arrangement being such that deflections of the tracing element are transmitted to the servo-control thus bypassing the yieldable spindle mounting. In describing the invention reference will be made to the drawings wherein:

FIGURE 2 is a view taken approximately along line 2—2 of the preferred embodiment of the invention shown in FIGURE 1;

FIGURE 3 is a partial plan view of the preferred embodiment of the invention with a part of the grinder support head broken away showing a portion of the grinder spindle mounting arrangement;

FIGURE 6 is a schematic illustration of an alternative servo-control arrangement using a tracing element for following the surface contours of the workpiece in front of the grinding wheel.

Figure 1:
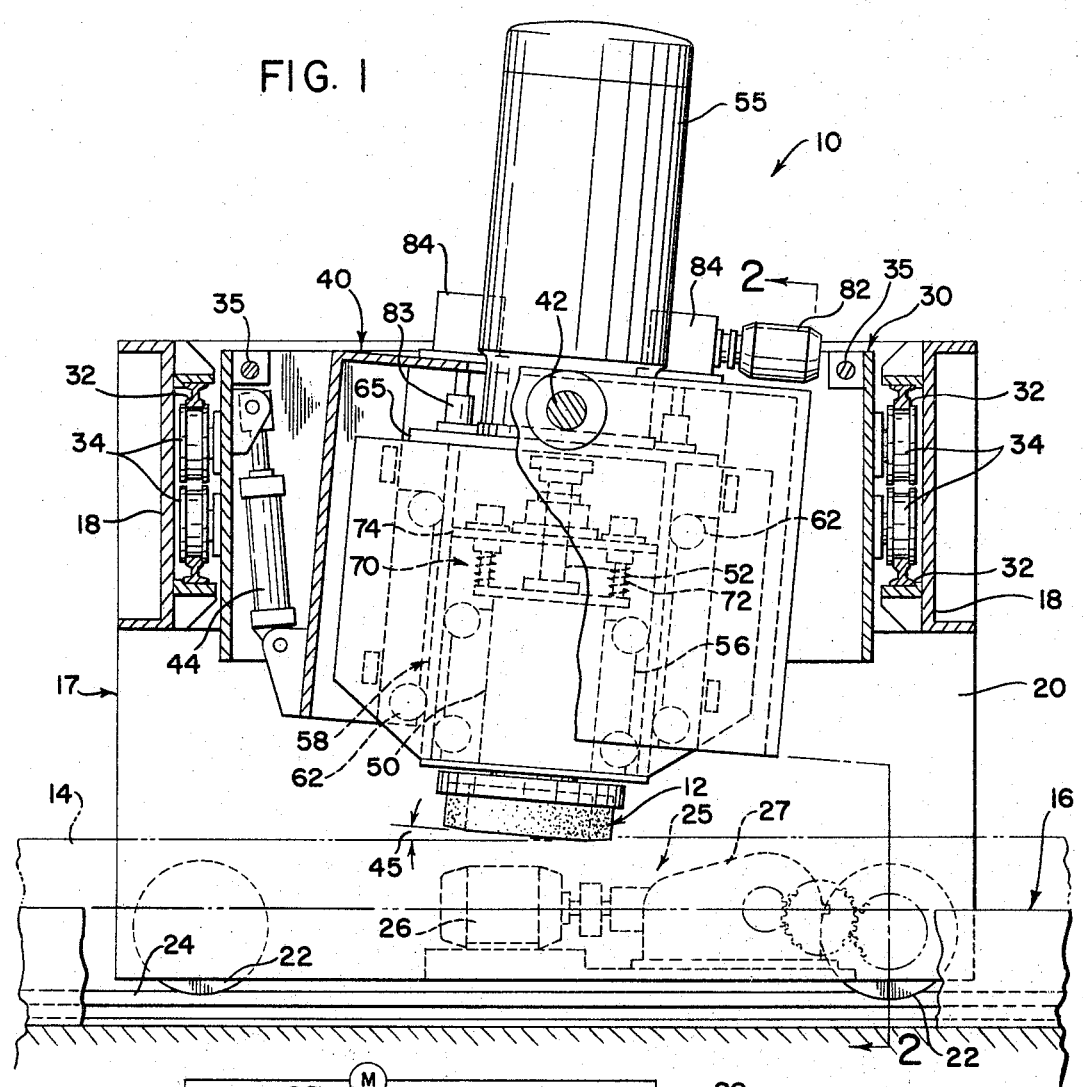
FIGURE 1 is an elevational view of a preferred embodiment of the invention partially broken away to show the grinder support head.

Referring now to the drawings wherein the showings are for the purpose of illustrating the preferred embodiment of the invention only and not for the purpose of limiting same, FIGURES 1-3 show a power grinder 10 having a grinding wheel 12 engaging the surface of a workpiece 14 which is clamped in any suitable manner on a holding fixture indicated generally at 16.

In more detail, the grinder 10 is supported from the floor by a frame 17 including cross frame members 18 supported above the workpiece 14 by side frame members 20 which have mounted thereon double flanged wheels 22 being guided on floor mounted rails 24 extending parallel to the workpiece 14. Traverse motion of the grinder 10 with respect to the workpiece 14 is provided by two synchronized drive units 25 mounted in each side frame 20. Each drive unit 25 includes a drive motor 26 connected to a gear reducer 27 for driving wheels 22 along the rails 24. Any suitable means for controlling the speed of traverse may be provided. Obviously, instead of moving the grinder 10, the workpiece 14 may be mounted for reciprocation in a manner similar to the arrangement shown in the aforementioned U.S. Patent 3,118,254.

GRINDER INDEXING

An indexing support head 30 is supported on rails 32 and bogies 34 between cross frame members 18 for indexing movement transverse to the direction of grind. Grinder indexing is by means of parallel ball nut and screw mechanisms 35 driven by drive chains 37 through a reversible drive motor 36. Thus the grinding wheel 12 has two major degrees of movement with respect to the workpiece 14, a traverse movement parallel to the workpiece and an indexing movement laterally or across the workpiece.

GRINDER TILTING

Figure 5:
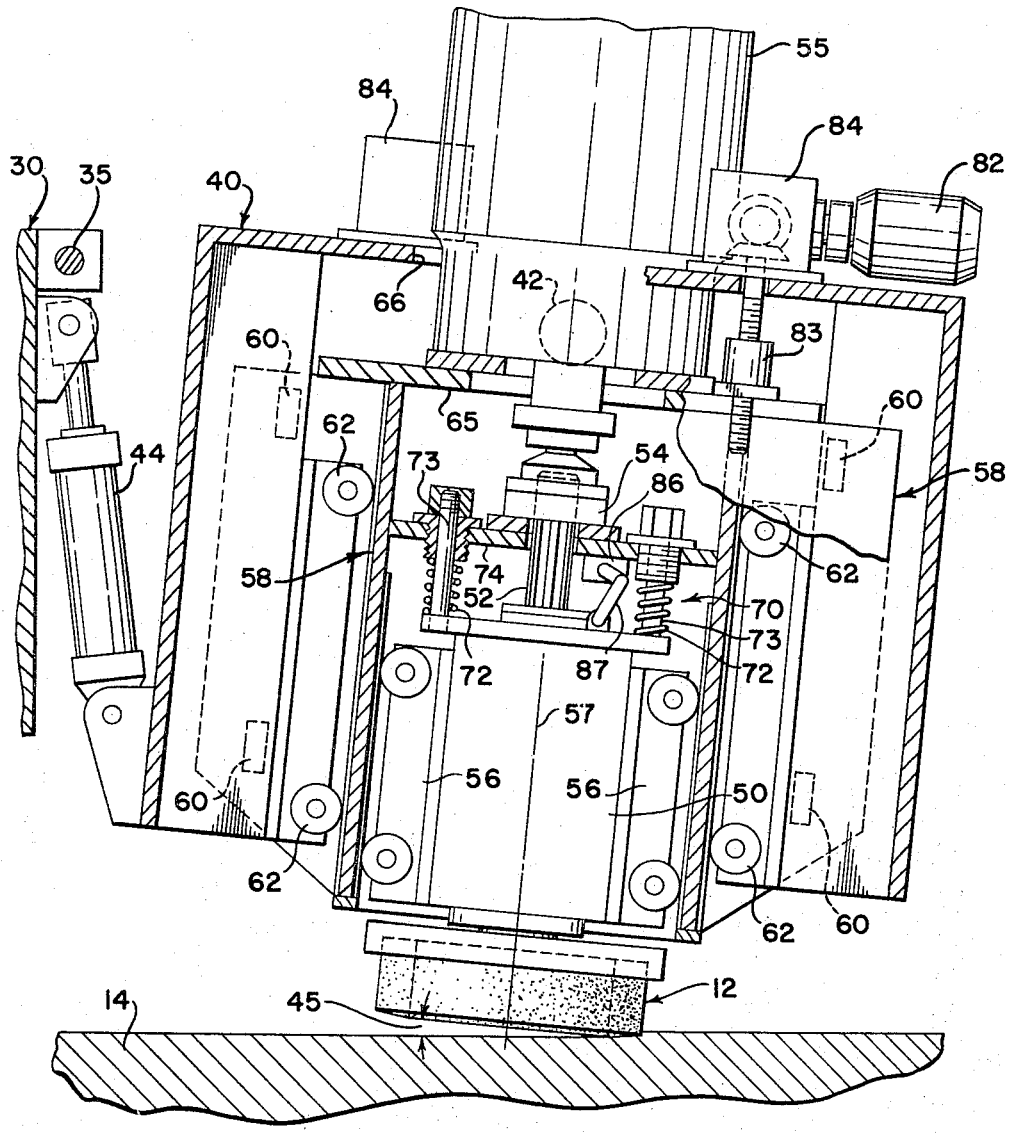
FIGURE 5 is an enlarged view showing the grinder support head broken away to reveal the yieldable mountings for the grinder spindle.

A tilting support head 40 is mounted on trunnions 42 within the space provided by the indexing support head 30. Trunnions 42 have an axis intersecting the grinding wheel axis and permit a third degree of movement of the grinding wheel 12 by pivoting the tilting support head 40. A pair of tilt cylinders 44 are connected between the tilting support head 40 and indexing support head 30 for adjustably holding the angle of tilt at an inclination slightly from vertical in the direction of grind. The angle of tilt may vary considerably but usually will range between 7 degrees maximum and 1 degree minimum in either direction from vertical depending upon the surface condition of the workpiece. Obviously, the direction of tilt from vertical will depend on the direction of grind. As shown in FIGURES 1 and 5, the grinding wheel 12 thus is inclined from horizontal at an angle of attack 45 relative to the workpiece 14 which is equal to the angle of tilt.

GRINDER MOUNTING

Referring now particularly to FIGURE 5, the grinding wheel 12 is supported for rotation on a grinder spindle 50 and is rotated through a ball-spline shaft 52 and spline-nut 54 by an electric motor 55. Attached to the grinder spindle 50 are four roller brackets 56 allowing the grinder spindle 50 to move up and down along the grinding wheel axis 57. A grinder support head 58 yieldably supports the spindle 50 and in turn moves up and down along the grinding wheel axis 57 on rollers 60 mounted on support head 58 and rollers 62 carried by the tilting support head 40. Motor 55 is mounted on a cross plate 65 of the grinder support head 58 and extends through an opening 66 in the tilting support head 40 for movement conjointly with the grinder support head 58.

In order to permit relative movement between the spindle 50 and support head 58 a resilient mounting is provided, generally indicated by the numeral 70, which allows the spindle 50 a limited yielding movement relative to the support head 58 as controlled by four coil springs 72. These springs are calibrated to give a certain compression rating at a known deflection and are used in conjunction with establishing a predetermined grinding pressure between the grinding wheel 12 and workpiece 14, as will be described. The mounting 70 includes four rods 73 slidably mounted in a spindle support plate 74 of the grinder support head 58 and prevent the spindle 50 from dropping out when the grinding wheel 12 is raised off of the work surface.

Thus in accordance with the invention, the grinder support head 58 and spindle 50, with grinding wheel 12 attached, are capable of rectilinear movement relative to each other along the tilted grinding wheel axis 57 by virtue of the resilient mounting 70. In addition, the support head 58 is reciprocal on rollers 60, 62 relative to the tilting support head 40 along the axis 57. Thus a novel telescoping grinder mount is provided which permits adjustment of the grinding wheel 12 toward and away from the workpiece to vary the grinding pressure as will be described hereinafter.

GRINDER POSITION CONTROL

If the surface of workpiece 14 being ground is not even, for example, if the surface curves upwardly, the pressure between the grinding wheel 12 and the surface is proportionately increased as the grinder traverses the workpiece 14.

Figure 4:
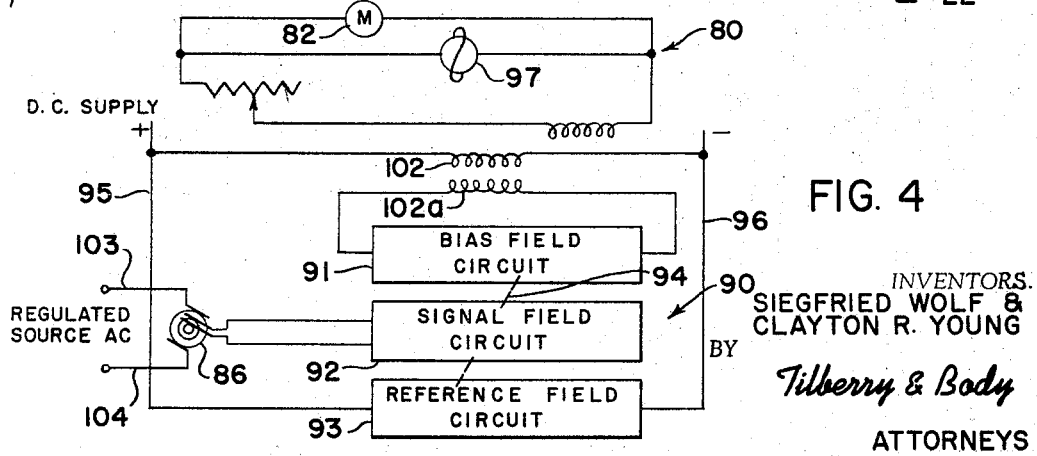
FIGURE 4 is an electrical circuit schematic of the servo-control used with the preferred embodiment of the invention for regulating the grinding pressure.

In order to maintain a predetermined grinding pressure and thus insure removal of a uniform thickness of material, a servo-position control mechanism, generally indicated by the numeral 80 in FIGURE 4, is provided similar to the position control of the type disclosed in U.S. Patent 3,100,954 issued August 20, 1963. As may be appreciated, other types of servo-controls may be used, such as the load responsive control disclosed in U.S. Patent 3,118,254 but in connection with the preferred embodiment of the invention, a position detecting control is preferred. When referring to a position control, the reference is to a servo-control for adjusting the grinding pressure between the grinding wheel and workpiece which is responsive to contour variation in the surface being ground as detected by the vertical position of the grinding wheel or a separate tracing element.

Grinding pressure between grinding wheel 12 and workpiece 14 is varied by means of the servo-position control 80 which includes reversible motor 82 operating in conjunction with the resilient mounting 70. Referring to FIGURE 5, independent adjustment of the grinder support head 58 is made through ball nut and screw mechanisms 83 driven in unison from bevel gear boxes 84 powered by the motor 82. By operating the motor 82 so that the grinder support head 58 moves downwardly, the calibrated coil springs 72 are compressed thus increasing the grinding pressure a known amount. By operating the motor 82 in the reverse, the grinding pressure is similarly reduced. A voltage regulating device 86, such as a selsyn transmitter, is attached to the underside of the spindle support plate 74 and has an adjustable linkage 87 connected to the top of the grinder spindle 50. Thus, any movement, either up or down, of the grinding wheel 12 and grinder spindle 50 relative to the spindle support head 58 will cause a change in the output signal of the transmitter 86. This signal is fed to a magnetic amplifier 90 of the servo-position control 80 (FIG. 4) which determines the direction of rotation of motor 82 and hence, the amount of vertical adjustment of the grinder support head 58 needed in order to maintain the predetermined uniform grinding pressure.

AUTOMATIC POSITION CONTROL

Referring now to FIGURE 4, the servo-position control 80 is illustrated schematically since the details thereof form no part of the present invention. For information concerning such details, reference is made to the above mentioned U.S. Patent 3,100,954. The control 80 includes a magnetic amplifier having a bias field circuit 91 and a signal field circuit 92 inductively coupled with a reference field circuit 93 as indicated by the dot-dash line 94. The signal field circuit 92 is connected to the output of the selsyn transmitter 86. The reference field circuit 93 is energized from a regulated DC supply 95, 96. The motor 82 is powered by what is commonly known as an Amplidyne generator 97 characterized in that it is equipped with a pair of field coils 102, 102a energized by the control circuit whereby the field coils are balanced off, each having the same number of ampere turns when the pressure between the grinding wheel 12 and the workpiece 14 is at the predetermined value. With the field coils thus balanced off, the output of the generator is zero and the motor 82 is at rest. When one field coil is excited so as to contain ampere turns in excess of the other field coil, the output of the generator is in such direction as to cause motor 82 to raise the grinder support head 58 thus reducing the pressure between the grinding wheel and the workpiece. When the ampere turns of the field coils are in reverse order, the direction of the output of the generator is reversed causing the motor 82 to move the grinder support head 58 downwardly compressing springs 72 increasing the grinding pressure. The field coil 102 is connected to the regulated DC voltage supply 95, 96 while the second field coil 102a is energized by the output of the bias field circuit 91.

OPERATION

In automatic operation, once a predetermined grinding pressure has been established with respect to the ampere turns of reference field circuit 93, as explained in U.S. Patent 3,100,954 the linkage 87 of the selsyn transmitter 86 is adjusted so that the output of the transmitter balances the signal field circuit 92 against the reference field circuit 93 such that the same number of ampere turns also exist on the field coils 102, 102a thus the output of the generator 97 is zero and motor 82 is at rest. The arrangement is such that the bias field 91 is unaffected when the ampere turns of the signal field 92 are equal to the ampere turns of the reference field 93. However, an increase in the ampere turns of the signal field 92 over the ampere turns of the reference field 93 will affect the bias field 91 to cause its output to coil 102 to increase, while an increase in the ampere turns of the reference field 93 over those of the signal field 91 will cause a decrease.

As the pressure between the grinding wheel 12 and workpiece 14 increases above the predetermined value, the output of the selsyn transmitter 86 increases substantially linearly which means that the voltage increases proportionately in the signal field 92 thereby increasing the ampere turns therein. The resulting increase in ampere turns of the coil 102a of the generator causes the motor 82 to operate so as to decrease the grinding pressure. Conversely, if the grinding pressure decreases from the predetermined value, there will be a linear decrease in the output of the transmitter 86 with a consequent proportional increase in the grinding pressure to compensate.

Referring now to FIGURE 6, a modification to the servo-control arrangement is shown in which like numerals with the addition of a prime mark will be used to identify like parts represented schematically. In this alternative arrangement, the mounting 70′ and grinding wheel 12′ are bypassed as a means for transmitting variation in surface unevenness to the servo-position control and instead a separate means for following the contours of the surface is provided which is independent of the grinder spindle 50′ and its mounting springs 72′. This arrangement includes a tracing roller 110 suitably mounted in front of the grinding wheel 12′. The roller 110 is biased by a spring hold-down 111 into engagement with the workpiece 14′ a known distance from the grinding wheel axis 57′ and is connected by a arm 114 directly to the selsyn transmitter 86′ mounted on the spindle support head 58′. Operation of the transmitter 86′ and servo-controlled motor 82′ is otherwise unchanged. Thus it is apparent that the error signal of the transmitter 86′ will not be determined by the deflections of spindle 50′ on its mounting 70′ but instead, will reflect the vertical position of tracing roller 110 with respect to the support head 58′. The distance between tracing roller 110 and the spindle axis 57′ will be coordinated with the response time of the servo-control so that the grinding pressure will not fluctuate appreciably from the predetermined value.

Having thus described and illustrated a preferred embodiment of the invention it will be understood that certain obvious modifications can be made by those skilled in the art without departing from the spirit of the invention as defined in the appended claims.

Having thus described our invention, we claim:

1. A grinding machine for removing a uniform thickness of material from an uneven workpiece surface comprising:
   a frame member positioned above said workpiece and extending across the surface to be ground,
   motor means for traversing the workpiece and frame member relative to each other at a predetermined speed in a grinding direction,
   a tiltable support head pivotally mounted on said frame member,
   motor means for tilting said support head at a predetermined angle in the direction of grind,
   a grinder support head mounted for reciprocal movement on said tiltable support head,
   a grinding spindle having a grinding wheel rotatably mounted thereon reciprocally mounted on said grinder support head,
   yieldable mounting means permitting limited movement of said spindle relative to the grinder support head including calibrated spring means biasing the spindle toward the workpiece surface, said spindle, spindle support head, and tiltable support head being telescopically mounted with respect to each other so that the spindle axis coincides with the angle of tilt of said tiltable support head,
   motor means for advancing and retracting said grinder support head toward and away from said workpiece along the common axis of tilt, and
   an electrical pressure control circuit means including means responsive to the grinding pressure which is proportional to the compression of said calibrated spring means, said circuit means causing operation of said motor means for advancing or retracting said grinder support head an amount sufficient to maintain a predetermined grinding pressure throughout the traversing movement.

2. A grinding machine as set forth in claim 1 wherein the pivot for the tiltable support head intersects with the common axis of said spindle and spindle support head.

3. A grinding machine having a rotatable grinder spindle adapted to be inclined slightly from vertical in the direction of grind comprising
   a tiltable support head pivotally mounted on an axis transverse to the direction of grind,
   a grinder support head mounted for reciprocatory movement on said tiltable support head parallel to the grinder spindle axis, yieldable mounting means permitting limited axial movement of said grinder spindle relative to the grinder support head such that the grinder spindle, spindle support head, and tiltable support head are telescopically movable relative to each other along the grinder spindle axis, and servo-control means for moving said grinder support head axially relative to said tiltable support head and grinder spindle so as to vary the deflection of said yieldable mounting means in accordance with external conditions for maintaining a predetermined grinding pressure.

References Cited

UNITED STATES PATENTS

| | | | |
|---|---|---|---|
| 282,049 | 7/1883 | Campbell | 51—56 |
| 1,027,558 | 5/1912 | Meyers | 51—54 |
| 1,085,876 | 2/1914 | Redden | 51—56 X |
| 2,128,023 | 8/1938 | Specht et al. | 51—56 |
| 3,100,954 | 8/1963 | DiLella | 51—165 |
| 3,118,254 | 1/1964 | DiLella | 51—45 |
| 3,128,888 | 4/1964 | DiLella | 51—45 X |
| 3,134,204 | 5/1964 | DiLella | 51—45 X |

LESTER M. SWINGLE, *Primary Examiner.*